United States Patent [19]
Weber

[11] 4,023,040
[45] May 10, 1977

[54] SENSING DEVICE USING PHOTOCELLS, FOR COLOR IDENTIFICATION

[75] Inventor: Rudolf Weber, Darmstadt-Eberstadt, Germany

[73] Assignee: Firma Weber Lichtsteuergerate KG, Darmstadt, Germany

[22] Filed: May 7, 1975

[21] Appl. No.: 575,444

[30] Foreign Application Priority Data

May 7, 1974 Austria ............................... 3758/74

[52] U.S. Cl. ........................ 250/566; 235/61.11 E; 250/226
[51] Int. Cl.² ......................................... G06K 7/10
[58] Field of Search ............ 340/173 LT; 250/226, 250/555, 566, 568, 569, 570, 578; 235/61.11 E; 340/173 LM, 173 LS, 173 LT; 209/111.6

[56] References Cited
UNITED STATES PATENTS

| | | | |
|---|---|---|---|
| 3,138,783 | 6/1964 | Toulmin | 340/173 LM |
| 3,555,852 | 1/1971 | Stock et al. | 250/226 |
| 3,560,758 | 2/1971 | Swanberg | 250/226 |
| 3,578,976 | 5/1971 | Schunack | 250/226 |
| 3,708,676 | 1/1973 | Huboi et al. | 250/226 |
| 3,904,872 | 9/1975 | Ebukuro et al. | 250/578 |

Primary Examiner—David C. Nelms
Attorney, Agent, or Firm—Ernest F. Marmorek

[57] ABSTRACT

A sensing system, for use in the identification of colored indicia defined on a body in a series arrangement, includes at least one flash lamp means electrically energizable to produce a burst of light to illuminate at least one of the indicia at a high level compared to the ambient light level, at least one photo-electric means disposed to receive light reflected from at least one of the illuminated indicia and operative to produce a sensor signal for light having a predetermined color, and detector means coupled to the photo-electric means and operative to be programmed to produce a test signal when the sensor signal is within a predetermined class of signals.

3 Claims, 1 Drawing Figure

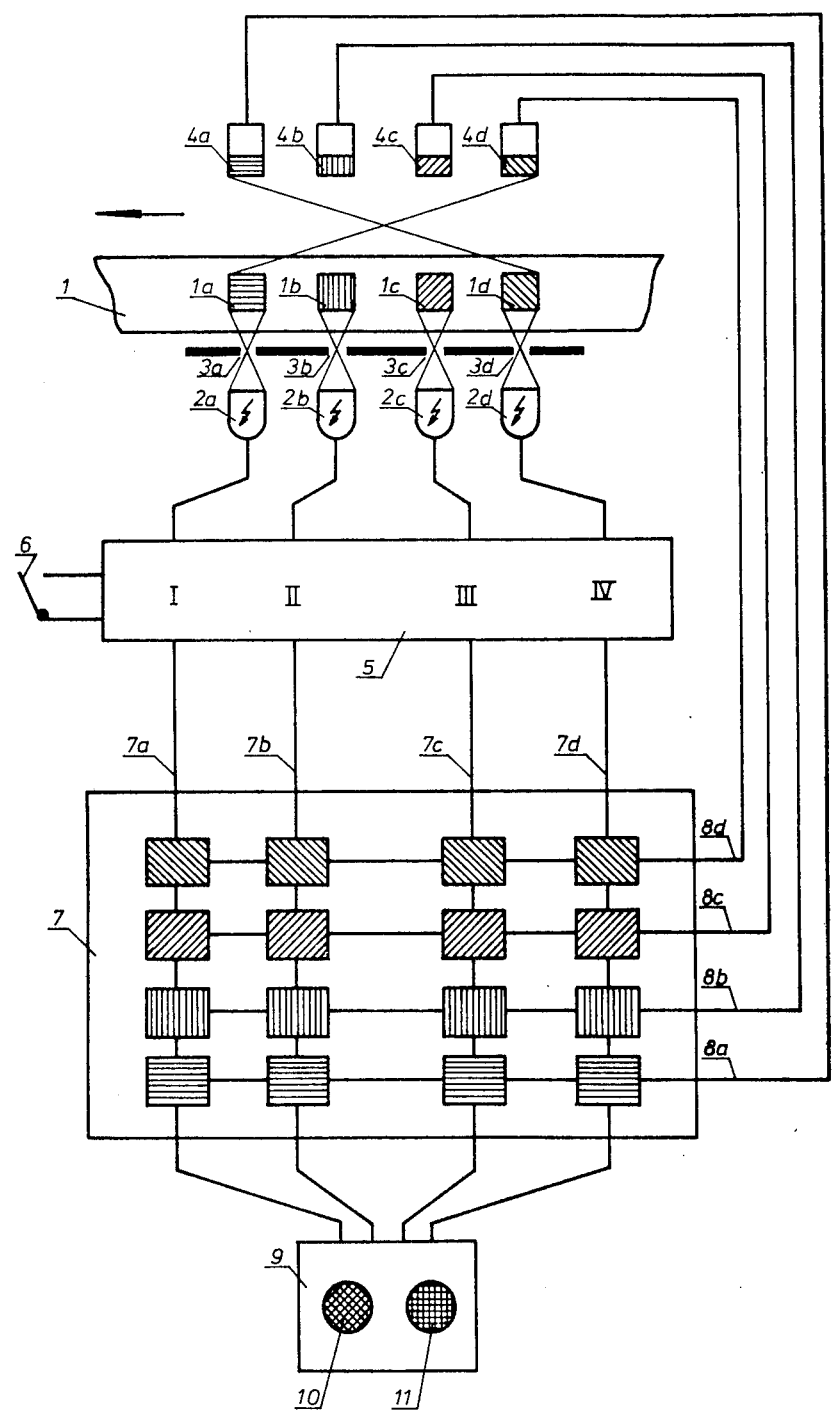

SENSING DEVICE USING PHOTOCELLS, FOR COLOR IDENTIFICATION

BACKGROUND OF THE INVENTION

The invention relates to a sensing system for use in the identification of colored indicia defined on a body in a series arrangement.

Typically, the use of up to four different colors in a series arrangement on a body permits 340 coding possibilities.

The prior art includes a device used in connection with colored rings printed on bodies such as ampoules wherein the ampoules are identified according to the colors and their locations as measured by a system including a light source moved across the rings and color sensitive photo-electric cells. This device has the drawback in that high intensity lamps are used to illuminate continuously the bodies and considerable heat is generated and the arrangement must provide a housing with ventilation and other cooling considerations. Another drawback of this device is the comparatively slow speed of the moving lamp which leaves open the possibility of an incorrect identification of the color rings for bodies moving relatively fast such as on a production conveyor belt.

SUMMARY OF THE INVENTION

One of the principle objects of the invention is a sensing system, for use in the identification of colored indicia defined on a body in a series arrangement, including at least one flash lamp means electrically energizable to produce a burst of light to illuminate at least one of said indicia at a high level compared to the ambient light, at least one photo-electric means disposed to receive light reflected from at least one of the illuminated indicia and operative to produce a sensor signal for light having a predetermined color, and detector means coupled to the photo-electric means and operative to be programmed to produce a test signal when the sensor signal is within a predetermined class of signals.

Another object of the invention is the sensing system wherein there are a plurality of flash lamp means each associated with one of the indicia and further comprising light control means operative to minimize substantially the light transmitted from each of the flash lamp means to all of the indicia except its associated one.

Another object of the invention is the sensing system wherein there are a plurality of the flash lamp means each being coupled to a voltage supply means, the voltage supply means including a pulse generator operative to produce a pulse signal at each of the flash lamp means in a predetermined sequence.

Another object of the invention is the sensing system wherein there are a plurality of photo-electric means each being operative for a predetermined color of light and each being disposed to receive the reflected light from all of the indicia, further comprising second coupling means operative for coupling all of the sensor signals to the detector means, the detector means including an input means in the form of a keyboard and being operative for programming the detector means.

Further objects and advantages of the invention will be set forth in part in the following specification and in part will be obvious therefrom without being specifically referred to, the same being realized and attained as pointed out in the claims hereof.

The invention accordingly comprises the feature of construction, combination of elements and arrangement of parts which will be exemplified in a construction hereinafter set forth and the scope of the application of which will be indicated in the claims.

The invention avoids the problem of heat dissipation found in the prior art devices and also provides the possibility of identifying colored indicia on a relatively fast moving body.

BRIEF DESCRIPTION OF THE DRAWING

For a fuller understanding of the nature and objects of the invention, reference should be had to the following detailed description, taken in connection with the accompanying drawing, in which:

The sole FIGURE shows a block diagram of a sensing system according to the invention.

DESCRIPTION OF THE PREFERRED EMBODIMENT

Typically, a body 1 has up to four colored indicia such as marks 1a, 1b, 1c, and 1d. Each of the marks could be a color selected from the group consisting of red, yellow, green and blue. In the FIGURE, the marks 1a, 1b, 1c, and 1d are symbolically shown as being different colors for the use of hatching of different orientations. Flash lamp means such as flash lamps 2a, 2b, 2c, and 2d are associated respectively with the marks 1a, 1b, 1c, and 1d and light control means such as slots 3a, 3b, 3c, and 3d are provided in order to limit the illumination of any one of the flash lamps to its associated mark position.

Four photo-electric means such as photocells 4a, 4b, 4c, and 4d are arranged so that each one can receive the light reflected from the marks 1a, 1b, 1c, and 1d as a result of the burst of light from one of the flash lamps 2a, 2b, 2c or 2d. Each of the photo-electric cells 4a, 4b, 4c, and 4d is operative to be responsive to one of the four selected colors and in the FIGURE the photo-electric cells are shaded differently in order to indicate that each one is responsive to a different color.

Each of the photo-electric cells 4a, 4b, 4c, and 4d are operative to produce a sensor signal in response to illumination within its color response range. The sensor signals are connected to a detector means such as detector 7 over the lines 8a, 8b, 8c, and 8d to a detector means such as detector 7.

Closure of switch 6 energizes voltage supply means such as generator 5 to produce pulse signals in some predetermined sequence such as I, II, III and IV. These pulse signals electrically energize the flash lamps 3a, 3b, 3c, and 3d and simultaneously transmit pulse signals over lines 7a, 7b, 7c, and 7d to the detector 7.

The detector 7 is a logic circuit programmed to produce a test signal for the detection of a predetermined series of colors on the body 1.

Detector 7 can be a programmable logic circuit assembled from standard modules such as described in "Logic Handbook 1973–74" prepared by the logics products group of Digital Equipment Corporation and available from that corporation.

The signals on lines 7a, 7b, 7c, and 7d in conjunction with the signals on lines 8a, 8b, 8c, and 8d are logic voltages from which the programmed detector 7 determines whether or not a predetermined color series is present on the body 1.

The detector 7 as shown in the FIGURE includes a keyboard with color coded keys indicated by the different hatching. The keys can either be colored or illuminated in color in order to identify them. The detector 7 is programmed for a particular color series to be identified by an operator pressing the colored keys in the respective series arrangement to be identified. The test signal from the detector 7 is connected to a display means such as indicator device 9 having lights 10 and 11. By design, the light 10 is illuminated for a match or identification of a predetermined color series whereas light 11 is illuminated for a mismatch.

The switch 6 can be designed to activate the generator 5 automatically when the body 1 is approximately in a predetermined position suitable for the identification of the colored indicia. The switch 6 can be of the type that is activated by the interruption of a light beam or the pressure of an object at a predetermined position.

The desired color response of the photocells 4a, 4b, 4c, and 4d can be achieved through the use of dichroid mirrors or through the use of other known optical techniques.

Another embodiment utilizes light conducting fibers for the transmission of the light from the flash lamps and/or photocells.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A sensing system, for use in the identification of colored indicia positioned on a body, comprising in combination:
   flash lamp means including a plurality of flash lamps each being energizable to produce a burst of light and being adapted to illuminate an associated one of said indicia,
   the number of said flash lamps corresponding to the maximum number of said indicia;
   photo-electric means associated with each one of said indicia of said maximum number;
   each of said photo-electric means being disposed to receive and sense light reflected from its associated indicium and operable to produce a first signal for light sensed having a predetermined color;
   voltage supply means coupled to said flash lamps and comprising a pulse generator operable to produce pulse signals to energize said flash lamps sequentially; and
   detector means coupled to each of said photo-electric means and operable to produce a second signal when said first signals are in a predetermined sequence of signals.

2. The sensing system as claimed in claim 1, further comprising coupling means operable for coupling said pulse signals to said detector means.

3. The sensing system as claimed in claim 1, wherein said detector means comprises display means operable to show visually the occurrence of said first signal.

* * * * *